US006802175B2

(12) United States Patent
Fillman et al.

(10) Patent No.: US 6,802,175 B2
(45) Date of Patent: Oct. 12, 2004

(54) ARTICULARLY MOUNTED BATTERY-POWERED WALK-BEHIND REEL LAWNMOWER

(76) Inventors: Alan R. Fillman, 6301 Berkshirelane, Racine, WI (US) 53406; Frank D. Gall, III, 310 E. Four Mile Rd., Racine, WI (US) 53402

( * ) Notice: Subject to any disclaimer, the term of this patent is extended or adjusted under 35 U.S.C. 154(b) by 23 days.

(21) Appl. No.: 10/289,864

(22) Filed: Nov. 7, 2002

(65) Prior Publication Data

US 2003/0061792 A1 Apr. 3, 2003

Related U.S. Application Data

(63) Continuation of application No. 09/873,918, filed on Jun. 5, 2001, now Pat. No. 6,487,837.

(51) Int. Cl.[7] .............................................. A01D 34/78
(52) U.S. Cl. ......................................... 56/11.9; 56/249
(58) Field of Search ...................... 56/6, 7, 11.9, 125, 56/13.6, 192, 249–254, 208, 209, 294

(56) References Cited

U.S. PATENT DOCUMENTS

| | | |
|---|---|---|
| 2,335,054 A | 11/1943 | Godwin |
| 3,514,926 A | 6/1970 | Heth et al. |
| 4,769,976 A | 9/1988 | Bassett et al. |
| 5,412,932 A | 5/1995 | Schueler |
| 5,533,326 A | 7/1996 | Goman et al. |
| 5,628,169 A | 5/1997 | Stiller et al. |
| 5,950,409 A | 9/1999 | Davies |
| 6,006,390 A | 12/1999 | Bischel et al. |
| 6,098,388 A | 8/2000 | Davies |

OTHER PUBLICATIONS

Toro Commercial Products brochure, "Greensmaster Walk Mowers", 1998.
Toro Commercial Products brochure, "Greensmaster 1000 and Greensmaster 500", Feb. 1994.
Toro Commercial Products brochure, "Greensmaster Walk Mowers—Greensmaster 500 Specifications", 1998.
Saxon Industries brochure, "Saxon 22 Inch Floating Head Greens Mower", Feb. 2001.
The Toro Company brochure, "Toro Greensmaster Flex 21", Feb. 2001.
TurfNet Monthly brochure, "Toro to Unleash Greensmower" Product Profile, Dec. 2000.
TurfNet Monthly brochure, "Wear Both Hats" vol. 7 No. 12, Dec. 2000.
Saxon brochure, "Baroness Twin Greens Mower", Feb. 2001.
Kyoeisha Co., Ltd., Owner's Handling Manual & Parts Catalog, no date.
Kyoeisha Co., Ltd., Additional Manual & Parts Catalog for Saxon Model, no date.
Kyoeisha Co., Ltd., Baroness Turfgrass Industry, no date.
Shibaura, Green.
Kyoeisha Co., Ltd., Baroness LM54GA–R–LM54GAS–R, no date.

*Primary Examiner*—Robert E Pezzuto

(57) ABSTRACT

A walk-behind battery-powered lawnmower having an assembly of a reel unit and a traction unit articularly connected together in an arrangement wherein the reel unit can conform in its vertical position to the elevation of the turf which is being mowed. Thus there is an articular connection between the two units, and the reel unit rides up and down in response to the turf undulations. An electric battery is supported on the traction unit, and there is required only an electric wire connection providing the rotation drive power from the battery to the mower reel. Separate electric controls between the battery and to a motor on the traction unit and one on the reel unit provide for operational speed control to thereby select the clip rate of grass cutting in an articular assembly.

24 Claims, 4 Drawing Sheets

ARTICULARLY MOUNTED BATTERY-POWERED WALK-BEHIND REEL LAWNMOWER

CROSS-REFERENCE TO RELATED APPLICATIONS

This application is a continuation of U.S. patent application Ser. No. 09/873,918 filed on Jun. 5, 2001 now U.S. Pat. No. 6,487,837. The disclosure of the above application is incorporated herein by reference.

FIELD OF THE INVENTION

This invention relates to an articularly mounted battery-powered walk-behind reel lawnmower, especially lawnmowers used in mowing golf course greens, tee areas, and the like where ultimate precision of mowing is required.

BACKGROUND OF THE INVENTION

Lawnmowers, such as greensmowers, are known in the art and they commonly employ reel cutters which are used for mowing golf course greens. In mowing present-day greens, it is desired that the grass be cut to a uniform height throughout the entire green. Where the green itself is not completely planar, it is desired that the cutting reel follow the contour of the green even where it has undulations of rises and valleys within the mowing swath presented by the reel.

SUMMARY OF THE INVENTION

The present invention provides a lawnmower which is a walk-behind type having minimal impaction of the green; and has maximum maneuverability; and is battery powered to have a lack of operation noise; and is arranged to be traction driven while having the cutting reel movable up and down to conform to the undulations of the green. The use of battery power is in contrast to the use of a gasoline powered mower which is inherently noisy and which can drip petroleum onto the green. Also, with a battery there is no air pollution as there is with a gasoline engine.

Another advantage of the present lawnmower is with regard to the modern need of lower cutting heights in order to accommodate increased speeds of the rolling golf ball on the green. Thus the cutting reel must be able to follow the contours of the golf course green. Here there are a traction unit and a reel unit articularly connected together, and the reel unit pivots both fore-and-aft and side-to-side relative to the mowing direction to produce optimum grass cutting.

Still further, the present lawnmower improves upon the gasoline driven mowers which inherently require a mechanical drive connection from the engine to the cutting reel itself. That requires hardware, such as the engine, clutches, gear drives, and a flexible drive shaft, and that prior art tends to restrict the articulation of the reel unit relative to its traction unit which supports the engine. Additionally, in the battery powered lawnmower of this invention, the traction unit and the reel unit each have their own electric drive motors, both of which can be operator-adjustable in speed and thereby select and control the frequency of cut, or clip rate, performed by the reel. That too produces a superior cut of the green.

So, with this battery powered lawnmower, the heretofore mentioned problems are eliminated, and the battery itself can be shifted in its position on the mower to achieve optimum balance for the assembled lawnmower. The reel unit can be easily removed from the traction unit for maintenance and to attach other units to the traction unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 3:
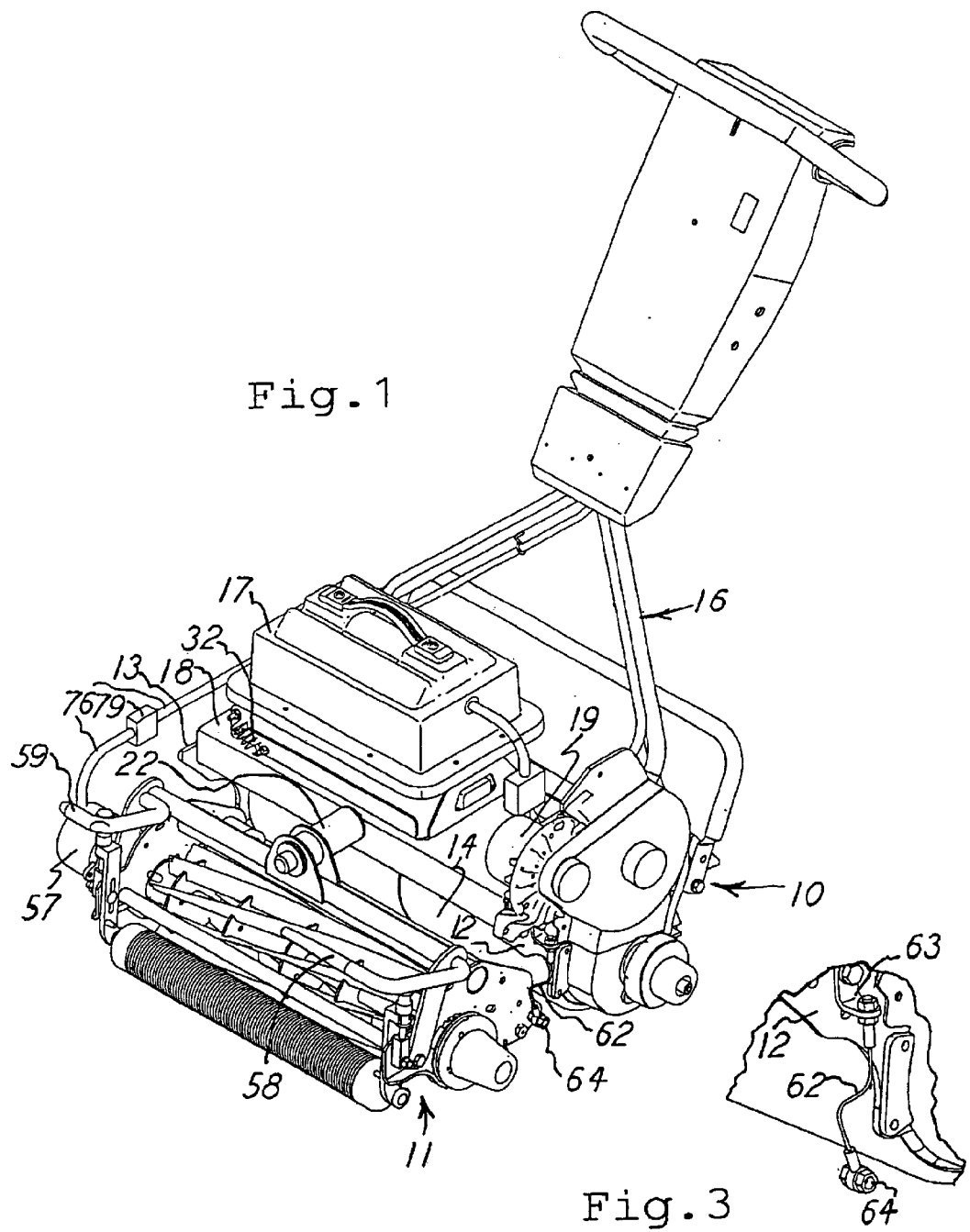
FIG. 1 is a front perspective view of the lawnmower of this invention.
FIG. 3 is a front perspective view of a fragment of FIG. 1.

The following description of the preferred embodiment(s) is merely exemplary in nature and is in no way intended to limit the invention, its application, or uses.

The drawings show a ground supported traction unit 10 and a reel unit 11 which is articularly connected with the traction unit 10. The entire assembly is particularly suitable for mowing the grass on a golf course green where ultimate mowing precision is required. In this arrangement, the mowing unit 11 is in the forward position relative to the mowing direction which is leftward, as viewed in FIG. 1. The articular, or sometimes called pivotal, connection is such that the mower 11 can move up and down in both end-to-end and fore-and-aft relationships, relative to the mowing direction and relative to the traction unit 10. In that universal articular movement, the mower 11 rides on and conforms to the contour of the surface of the green or the like being mowed, thus assuring the ultimate mowing precision.

The traction 10 includes two side plates 12 and 13 and a lawn roller 14 is rotatably supported by the plates and is suitably rotationally driven to propel the assembly on the ground, in the usual arrangement. A handle 16 is attached to the unit 10 for maneuvering the assembly on the ground, and thus the assembly is an operator walk-behind lawnmower, rather than a rider lawnmower.

The lawnmower is battery powered by an electric battery 17 supported on the traction unit frame which includes a platform 18 and the two side plates 12 and 13. An electric motor 19 is supported by the plate 12 and is electrically connected to the battery 17 and the motor 19 is in suitably mechanically connected with the roller 14 to thereby be in driving relationship to the roller 14 to thereby propel the lawnmower.

The traction unit 10 has a horizontally and forwardly extending cylindrically shaped mounting post 21 fixedly mounted on the traction unit 10 and extending centrally therefrom in the forward direction of mowing. The mower unit 11 has a hollow cylinder or sleeve 22 which extends horizontally and onto the post 21 to telescope therewith and be snug thereon. Thus, the inner diameter of the cylinder 22 approximates the diameter of the post 21, and the sleeve 22 is rotatable on the post 21 about the longitudinal axis designated "A" of the post 21. Any suitable means can be employed to secure the sleeve 22 longitudinally to the post 21 and have the sleeve 22 rotatable thereon. Thus, the sleeve 22 is pivotal about the axis A.

Figure 2:
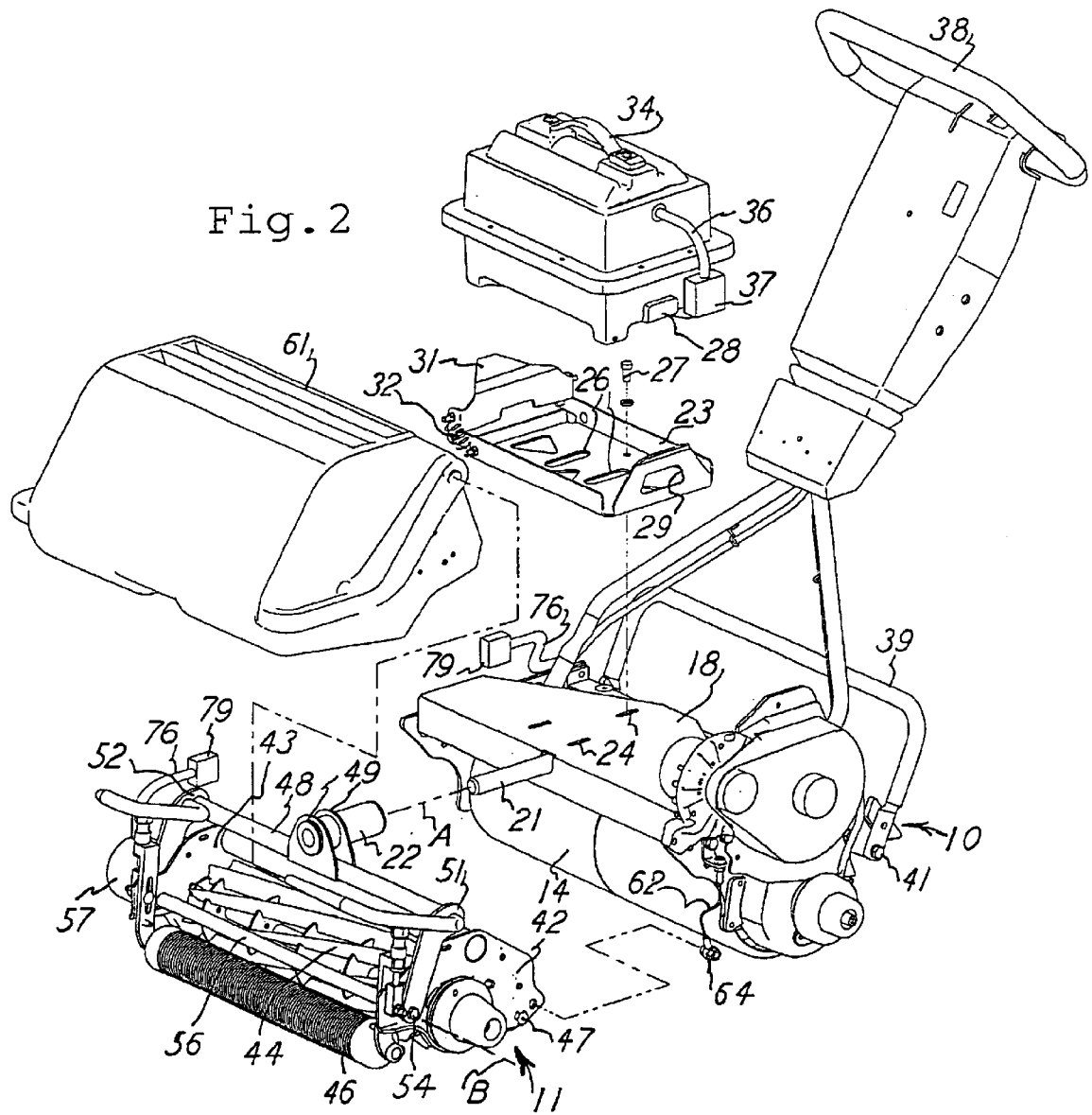
FIG. 2 is an exploded front perspective view of the lawnmower shown in FIG. 1.

Except for the parts as specially described herein, the traction unit is of a conventional construction, and it can have a forward balance relative to the longitudinal line along the circumference of the drum 14 in contact with the ground. As seen in FIG. 2, the battery 17 is supported on a tray 23 which in turn rests on the platform 18. Fore-and-aft extending slots 24 and 26, respectively on the platform 18 and the tray 23, and with bolts, such as bolt 27, provide for fore-and-aft adjustable positioning of the battery relative to the remainder of the traction unit 10. In that arrangement, the fore-and-aft balance of the traction unit 10 can be adjusted to thereby place selective downward force on the reel unit 11 through the traction post 21.

The battery 17 is preferably in a box and is held down on the tray 23, or its box bottom, by a battery box projection 28 disposed in a slow 29 in the tray 23 and by a pivoted latch 31 on the tray 17 which snaps onto another but unshown battery box projection which is like the projection 28 and is on the far side of the battery 17. A tension spring 32 holds the latch 31 onto the battery or its box until the operator pivots the latch 31 free of the battery box 17. The operator can then lift the battery off the tray by lifting through a battery handle 34.

Figure 4:
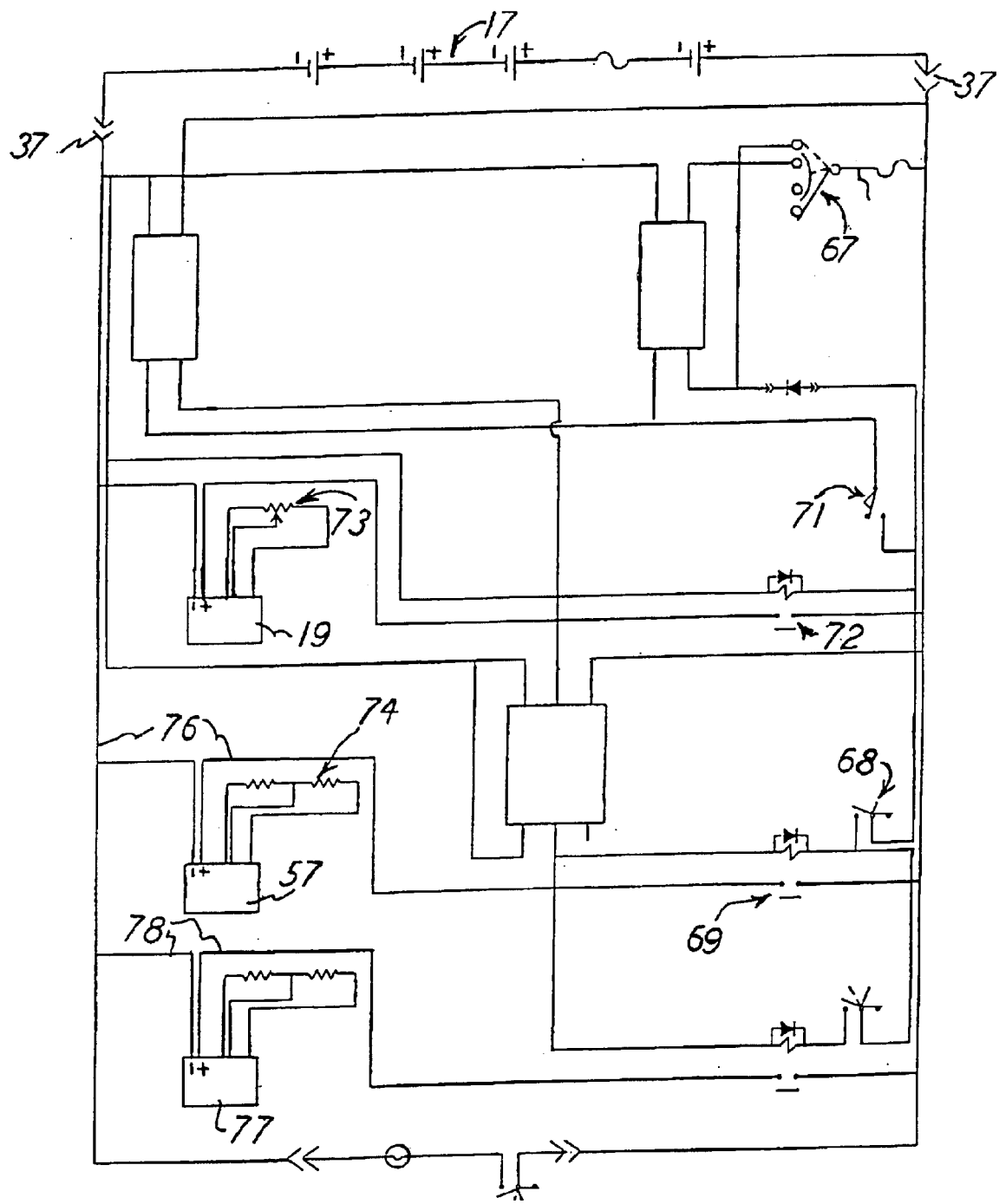
FIG. 4 is a wiring diagram of the electrical system.
Figure 5:
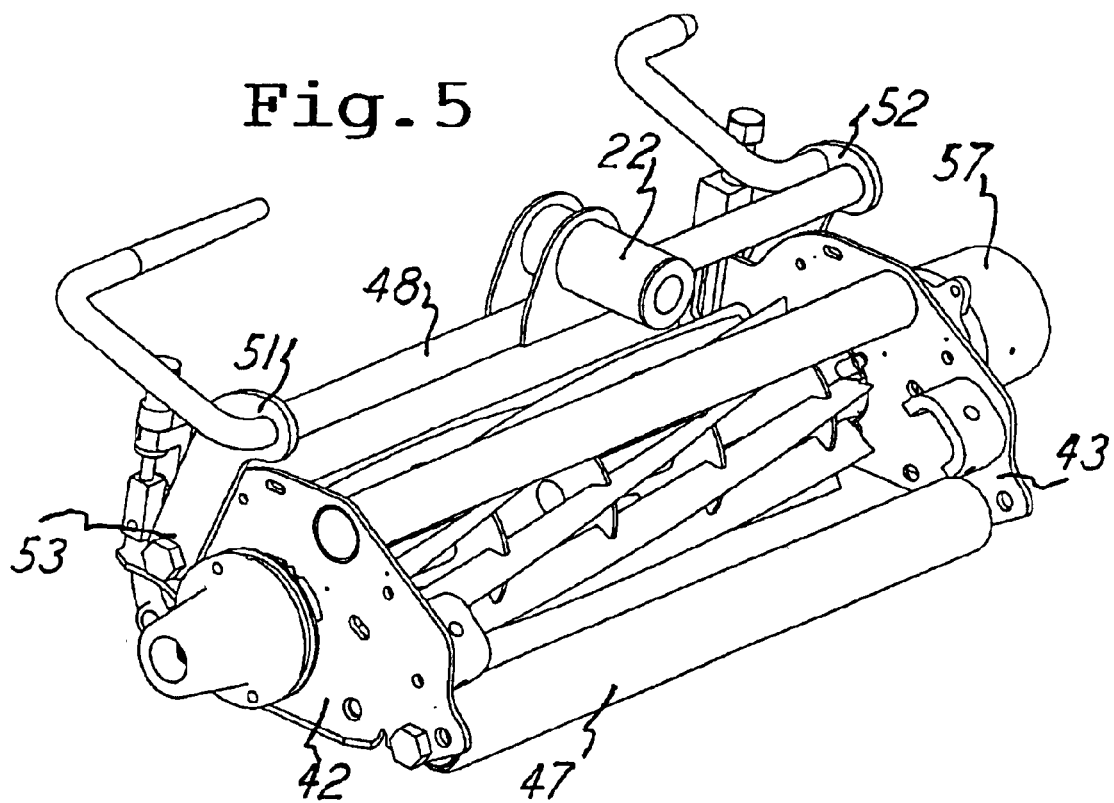
FIG. 5 is a rear perspective view of the reel unit.

An electric wire 36 and a quick disconnect plug 37 extend from the battery 17, and it will be understood that there are additional wires extending from the plug 37 to the remainder of the electric system shown in FIG. 4. Thus the battery can be readily serviced for recharge, replacement, storage, or whatever.

The handle 16 includes an operator's hand grip portion 38, and electric controls are also positioned adjacent the portion 38 for access to the operator and thereby electrically control the assembled mower, as shown in the diagram in FIG. 4.

A floor stand 39 is pivoted at 41 to the traction frame and it can be pivoted clockwise toward the ground or floor to upwardly support the traction unit 10 when free of the reel unit 11 for storage or servicing.

The reel unit 11 includes two side plates 42 and 43 for rotatably supporting the usual cutting reel 44 which is special for golf course green mowing. A reel roller 46 and another but unshown roller on the axis 47 extending between the plates 42 and 43 support the reel unit on the ground. Those two rollers provide for the reel unit 11 to ride on the ground and follow the contour of the ground in its usual up and down undulations. It will be understood that a free-body reel unit 11, that is one without the traction unit 10, will float or move up and down in its movement over the ground being mowed, and it will do so at each reel end adjacent the plates 42 and 43 and also in the plane fore-and-aft in the mowing direction. That is, the reel unit 11 can tip side-to-side and fore-and-aft to thereby track the ground contour and remain in optimum contact with the ground throughout the swath being mowed.

A cross bar 48 is rigidly connected to the sleeve 22, such as by the interconnecting plates 49, and the bar 48 extends from end-to-end of the reel unit and links 51 and 52 are affixed to the two ends of the bar 48 and extend therebelow and slightly forwardly. Thus, up and down movement of each end of the reel unit 11 causes respective up and down movement of the bar 48. The links 51 and 52 have depending ends 53 and they are respectively pivotally pinned to the side plates 42 and 43 by two bolts 54, such as by the shown bolt 54, and they are on a common axis "B" between the bolts 54 and extending across the reel unit 11. That axis B can be concentric with a cross rod 56 extending between the side plates 42 and 43. Thus, the reel unit 11 is free to pivot about the axis B, and such pivoting is determined by the contour of the ground on which the reel unit is riding and as influenced by the two rollers on the reel unit.

FIG. 1 shows there is an electric motor 57 mounted on the plate 53 and it is drivingly connected to the reel 44 to rotate the reel 44 in the cutting action. There are grass catcher mounting tines 58 and 59 respectively affixed to the links 52 and 53 and a grass catcher 61 can be slidably mounted onto the tines 58 and 59.

A flexible cable, such as the shown cable 62 and particularly as seen in FIG. 3, is at each end of the reel unit 11 and the cable upper ends are respectively attached to the traction unit 10 at the respective bracket 63 on the traction unit respective side plates 12 and 13. The respective lower ends of the two cables 62 are attached to the reel unit such as by the shown screw and nut connection at 64 which is affixed to the reel unit side plate 42. So the cables 62 limit the downward movement of the rear of the reel unit 11, and they provide a lost motion connection between the units 10 and 11.

The reel side-to-side action is achieved by the pivot of the reel unit 11 about the axis A in response to the ends of the reel unit adjusting up and down to the ground undulations. The reel unit's fore-and-aft pivoting is about the axis B and is achieved by the pivot of the reel unit in response to the reel unit's fore-and-aft tilt in accord with the two rollers riding on the ground being mowed. The rollers at 46 and 47 are respectively in front of and behind the cutting reel 44. Likewise, the vertical plane of the pivot axis B is between the rollers at 46 and 47.

So the traction unit 10 propels the assembly in the cutting operation and it bears downwardly on the reel unit 11 which is thereby kept firmly on the ground being mowed. That is achieved while the reel unit 11 is capable of the two-way pivot action described above. The geometry is such that the longitudinal axis of the bar 48 is rearward of the vertical plane of the axis B and is in a vertical plane which is between the two reel rollers. So the action of the traction unit 10 on the reel unit 11 is forwardly and downwardly to thereby assure firm reel unit 11 contact with the grass being mowed.

The aforementioned is achieved in a battery powered and walk-behind lawnmower, both features which are optimum preference for a golf course. The achievement does not require a mechanical drive connection between the traction unit and the reel unit, but only the flexible electric wires are employed.

FIG. 4 shows the electric system where the battery 17 is seen electrically connected to various electric components, and the battery connector 37 is seen and there is a key switch 67.

The traction motor 19 and the reel motor 57 are suitably connected in the system with the wires shown. An operator manually controllable switch 68 energizes a contactor 69 which is connected to the reel motor 57. A manually controllable switch 71, which can be a usual mower safety bail switch, energizes a contactor 72 which is connected to the traction motor 19. A variable resistor 73 is controllable by the operator and is connected with the traction motor 19 which can therefore be controlled by the operator to rotate at selective speeds and thus control the movement of the mower on the ground. A resistor 74 is shown connected with the reel motor 57, so the speed of the traction motor 19 determines the clip rate of the cut performed by the rotation and forward movement of the reel 44. The resistor 74 could be under the control of the operator and also be a variable resistor like resistor 73 and then the rotation speed of the reel 44 could be adjusted, as desired. In all events, the rate of cut or clip rate, that is the cuts per increment of forward movement of the entire mower, can be adjusted, as best suited for the quality and preference of cutting.

In all events only the wires, such as the wires 76, are the only so-called rotation drive connection required between the traction unit and the reel unit 11, no mechanical drive connection is required for the rotation of the reel 44.

While the foregoing describes the invention as it relates to a reel mower unit, it is also useful in the inclusion of other implements which can be pivotally attached to the traction unit 10 in the arrangement as shown with the reel unit 11.

The articular arrangement of the traction unit 10 and the driven unit 11 is such that implements other than the shown reel mower can be substituted for the reel unit 11. For instance, there could be a rotationally driven lawn groomer or a sweeper. Ready disconnect of the reel unit 11 will permit the attachment of these unshown other rotational implements. All that is required is the release of the cable 62 and the electric disconnect of the wires 76 and sliding the sleeve 22 off the post 21 after a conventional connector is released from its connection between the sleeve 22 and the post 21 to permit longitudinal movement of the sleeve 22 off the post 21.

The lower portion of the wiring diagram in FIG. 4 shows the substituted implement motor 77 with its wires 78 in the system, and that would be in place of and in the location of the reel motor 57 and its wires 76. An electric quick-disconnect connector 79 connects with the wires 76 or 78, depending on which implement is installed at the time. All is arranged so the implement in use can be readily attached and detached relative to the traction unit 10. Further, the wires provide the rotational drive connection to the motors 57 and 77 and there is the flexibility in that drive connection so the reel unit 11 can articulate, as described.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A battery powered lawnmower comprising:
    a traction unit supportable on turf and moveable thereon;
    a first electric motor operable to power said traction unit along said turf;
    a grass cutting unit connected to said traction unit for pivotal movement therewith, said grass cutting unit moveable with said traction unit in a forward cutting direction, said grass cutting unit having a length extending transverse to said cutting direction, said length having opposite ends;
    a ground engaging roller rotatably coupled to said grass cutting unit and extending transversely to said cutting direction, said ground engaging roller in constant contact with said turf thereby pivoting said grass cutting unit at each said opposite end and translating said grass cutting unit vertically relative to said turf along said length thereof in response to undulations in said turf;
    a second electric motor operable to power said grass cutting unit;
    a battery removably disposed on the lawnmower and communicating with said first and second electric motors; and
    at least one connector interconnected between said traction unit and said grass cutting unit for limiting downward travel of said grass cutting unit with respect to said traction unit.

2. The battery powered lawnmower of claim 1 wherein said grass cutting unit is a reel type cutting unit.

3. The battery powered lawnmower of claim 1 wherein said battery is disposed on said traction unit.

4. The battery powered lawnmower of claim 1, further comprising a walk-behind operator handle attached to said traction unit for maneuvering said traction unit on said turf.

5. The battery powered lawnmower of claim 1, further comprising flexible electric wires electrically connected between said battery and said grass cutting unit for transmitting electricity to said second electric motor and accommodating the pivoting of said grass cutting unit.

6. The battery powered lawnmower of claim 1 wherein said at least one connector includes a first and second flexible cable extending from each of said opposite ends of said grass cutting unit to said traction unit, said flexible cables limiting pivotal movement of said grass cutting unit with respect to said traction unit.

7. The battery powered lawnmower of claim 1, further comprising a pivot post and a sleeve telescoped on said post and extending along a pivot axis in said cutting direction, said pivot post and said sleeve separately coupled to said traction unit and said grass cutting unit.

8. The battery powered lawnmower of claim 1, further comprising in adjustable electric control connected between said battery and at least one of said first and second motors for adjusting electric power and thereby adjust the cutting rate said grass cutting unit.

9. A battery powered lawnmower comprising:
    a traction unit supportable on turf and moveable along said turf in a cutting direction by a first electric motor;
    a grass cutting unit coupled to said traction unit and having a length extending transversely along said cutting direction;
    a roller connected to and laterally offset along said length of said grass cutting unit, said roller in constant contact with said turf and imposing an up and down motion onto said grass cutting unit in response to undulations in said turf;
    a pivot joint interconnecting said traction unit and said grass cutting unit, said pivot joint having an axis of rotation along said cutting direction to impose pivotal movement between said traction unit and said grass cutting unit in response to undulations in said turf;
    a second electric motor providing power to said grass culling unit; a battery removably disposed on the lawnmower and electrically coupled to said first and second electric motor; and
    at least one connector extending between said traction unit and said grass cutting unit for limiting downward movement of said grass gutting unit relative to said traction unit.

10. The battery powered lawnmower of claim 9 wherein said grass cutting unit is a reel type cutting unit.

11. The battery powered lawnmower of claim 9 wherein said battery is disposed on said traction unit.

12. The battery powered lawnmower of claim 9, further comprising a walk-behind operator handle attached to said traction unit for maneuvering said traction unit on said turf.

13. The battery powered lawnmower of claim 9, further comprising flexible electric wires electrically connected between said battery and said grass cutting unit for transmitting electricity to said second electric motor and accommodating the pivoting of said grass cutting unit.

14. The battery powered lawnmower of claim 9 wherein said pivot joint includes a pivot post and a sleeve telescoped on said post and extending along said axis of rotation and being separately coupled to said traction unit and said grass cutting unit.

15. The battery powered lawnmower of claim 9, further comprising an adjustable electric control connected between said battery and at least one of said first and second motors for adjusting electric power and thereby adjust the cutting rate of said grass cutting unit.

16. A battery powered lawnmower comprising:
   a traction unit supportable on turf and moveable in a cutting direction thereon by way of a first electric motor;
   a grass cuffing unit articularly connected to said traction unit, said grass cutting unit providing pivotal motion in a tore-and-aft and side-to-side direction relative to said cutting direction;
   a ground engaging member coupled to said grass cutting unit for imposing said pivotal motion onto said grass cutting unit in response to undulations encountered in said turf as the lawnmower moves in said cutting direction;
   a second electric motor operable to power said grass cutting unit; and
   a battery removably disposed on the lawnmower and communicating with said first and second electric motors.

17. The battery powered lawnmower of claim 16, further comprising at least one connector interconnected between said traction unit and said grass cutting unit for limiting downward travel of said grass cutting unit with respect to said traction unit.

18. The battery powered lawnmower of claim 16 wherein said grass cutting unit is a reel type cutting unit.

19. The battery powered lawnmower of claim 16 wherein said battery is disposed on said traction unit.

20. The battery powered lawnmower of claim 16, further comprising a walk-behind operator handle attached to said traction unit for maneuvering said traction unit on said turf.

21. The battery powered lawnmower of claim 16, further comprising flexible electric wires electrically connected between said battery and said grass cutting unit for transmitting electricity to said second electric motor and accommodating the pivoting of said grass cutting unit.

22. The battery powered lawnmower of claim 16, further comprising a pivot post and a sleeve telescoped on said pivot post and extending along a pivot axis laterally disposed with respect to said cutting direction, said pivot post and said sleeve separately coupled to said traction unit and said grass cutting unit.

23. The battery powered lawnmower of claim 16, further comprising an adjustable electric control connected between said battery and at least one of said first and second motors for adjusting electric power and thereby adjust the cutting rate of said grass cutting unit.

24. The battery powered lawnmower of claim 23 wherein said ground engaging member includes a first roller rotatably coupled to said grass cutting unit and extends transversely to said cutting direction.

* * * * *

UNITED STATES PATENT AND TRADEMARK OFFICE
CERTIFICATE OF CORRECTION

PATENT NO. : 6,802,175 B2  Page 1 of 1
APPLICATION NO. : 10/289864
DATED : October 12, 2004
INVENTOR(S) : Alan Fillman et al.

It is certified that error appears in the above-identified patent and that said Letters Patent is hereby corrected as shown below:

On the title page under item [*], insert --This patent is subject to a terminal disclaimer.--

Column 2, line 54, delete "in"

Column 3, line 20, "slow 29" should be --slot 29--

Column 3, line 32, "in" should be --an--

Column 6, line 35, after "rate" insert --of--

Column 6, line 59, "gutting" should be --cutting--

Column 7, line 22, "tore" should be --fore--

Signed and Sealed this

Twenty-first Day of October, 2008

JON W. DUDAS
*Director of the United States Patent and Trademark Office*